(12) United States Patent
Kim

(10) Patent No.: US 6,834,032 B2
(45) Date of Patent: Dec. 21, 2004

(54) METHOD, APPARATUS, AND MEDIUM INCLUDING COMPUTER READABLE CODE FOR PROCESSING DATA IN A DRIVE

(75) Inventor: In-koo Kim, Anseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/776,260

(22) Filed: Feb. 12, 2004

(65) Prior Publication Data

US 2004/0160870 A1  Aug. 19, 2004

(30) Foreign Application Priority Data

Feb. 17, 2003  (KR) ................................ 10-2003-0009771

(51) Int. Cl.[7] ................................................ G11B 5/09
(52) U.S. Cl. ................................ 369/47.44; 369/53.12; 369/53.3
(58) Field of Search ........................... 369/47.14, 47.44, 369/53.12, 53.13, 53.18, 53.3, 53.42, 53.43

(56) References Cited

U.S. PATENT DOCUMENTS 5,528,574 A    6/1996  Takeuchi et al.
6,751,174 B1 *  6/2004  Takahashi ................ 369/47.37

* cited by examiner

Primary Examiner—Paul W. Huber
(74) Attorney, Agent, or Firm—Staas & Halsey LLP

(57) ABSTRACT

A method, apparatus, and medium for processing data in a Read Only Memory (ROM) drive. The data processing method includes: a ROM drive detecting, buffering, and decoding data at a target location on an optical recording medium; if one of data detection, data buffering, and data decoding fails, checking a CLV speed of the optical recording medium, adjusting a CAV speed of the optical recoding medium, and retrying data detection, data buffering, and data decoding; and if data detection, data buffering, and data decoding are performed successfully, transmitting the decoded data to the host computer. Therefore, it is possible to improve the quality of a ROM drive, by preventing the deterioration of data readability and error generation caused by speed deterioration of the ROM drive, from defects of an optical recording medium.

19 Claims, 4 Drawing Sheets

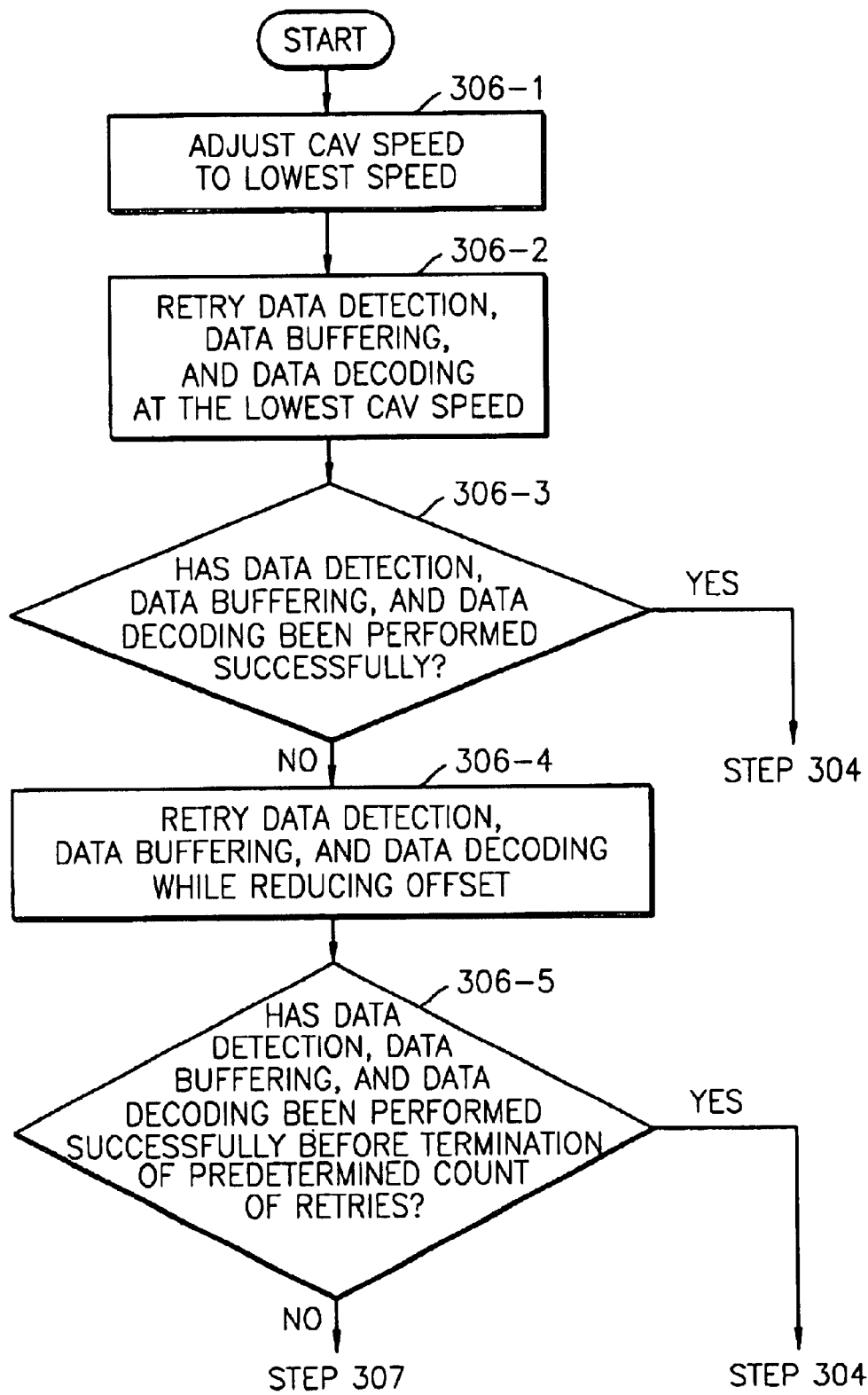

METHOD, APPARATUS, AND MEDIUM INCLUDING COMPUTER READABLE CODE FOR PROCESSING DATA IN A DRIVE

CROSS-REFERENCE TO RELATED APPLICATIONS

This application claims the priority of Korean Patent Application No. 2003-9771, filed on Feb. 17, 2003, in the Korean Intellectual Property Office, the disclosure of which is incorporated herein in its entirety by reference.

BACKGROUND OF THE INVENTION

1. Field of the Invention

The present invention relates to a method, apparatus, and medium for operating a Read Only Memory (ROM) drive, and more particularly, to a method, apparatus, and medium for processing data in a Read Only Memory (ROM) drive capable of preventing deterioration of data readability and error generation caused by speed deterioration of a ROM drive, caused by defects of an optical recording medium.

2. Description of the Related Art

After the development of audio CDs, various additional types of media have been developed, according to various social demands.

FIG. 1 is a flow chart illustrating a method of processing data in a Read Only Memory (ROM) drive, according to a conventional technique, wherein the ROM drive reads data from an optical recording medium and transmits the data to a host computer.

Referring to FIG. 1, if the ROM drive receives a command requiring data from the host computer, the ROM drive checks whether the corresponding data exists in the buffer thereof (operation 100). If the data required by the host computer does not exist in the buffer, the ROM drive sets the buffer to an Empty state and sets a target location on an optical recording medium where the corresponding data exists (operation 101). Then, the ROM drive controls an optical pick-up to seek the target location. Thereafter, the ROM drive determines whether the optical pick up has found the target location (operation 102). If the optical pick-up has found the target location, the corresponding data at the target location is read, buffered, decoded, and then transmitted to the host computer (operations 103 and 104). However, in a case where defects such as scratches or black dots, for example, exist on the optical recording medium, the optical pick-up cannot correctly seek the target location. In this case, the ROM drive reduces a predetermined count, which is set according to the speed at which it runs, using a counter, and then decreases the speed (operations 105 and 106). Here, the counter counts a retry count of a process of the corresponding data at the target location being detected, buffered, and decoded. The retry count is predetermined, according to a speed of the ROM drive. Then, it is determined whether the ROM drive is operating at the lowest speed (operation 107). If data detection, data buffering, or data decoding fails when the ROM drive operates at the lowest speed, an error is generated and transmitted to the host computer (operation 108). In operation 100, if the corresponding data exists in the buffer, the process jumps to operation 104 to decode the corresponding data stored in the buffer and transmit the decoded data to the host computer.

The conventional method for processing data in the ROM drive as described above is also disclosed in U.S. Pat. No. 5,528,574.

In summary, according to the conventional method, the ROM drive reads data while gradually decreasing the speed of the optical recording medium, if defects such as scratches or black dots, for example, are present on the optical recording medium when reading data from the optical recording medium. If the ROM drive cannot read the data even at its lowest speed, the ROM drive generates an error. However, when data should be read at a faster speed than at a current speed in a certain area on the optical recording medium, the conventional method cannot read the data, thereby generating errors and deteriorating the quality of the ROM drive.

SUMMARY OF THE INVENTION

Embodiments of the present invention include a method, apparatus, and medium for processing data in a ROM drive preventing deterioration of data readability and error generation caused by speed deterioration of the ROM drive, from defects on an optical recording medium.

Additional aspects and/or advantages of the invention will be set forth in part in the description which follows and, in part, will be obvious from the description, or may be learned by practice of the invention.

To accomplish the above and/or other aspects and advantages, embodiments of the present invention provide a method of processing data, including detecting, buffering, and decoding data at a target location on an optical recording medium, checking a CLV speed of a drive for the optical recording medium, adjusting a CAV speed of the drive for the optical recoding medium, and retrying data detection, data buffering, and data decoding if one of the data detection, data buffering, and data decoding fail, and transmitting the decoded data to a host computer if the data detection, data buffering, and data decoding are performed successfully.

The adjusting of the CAV speed and retrying of the data detection, data buffering, and data decoding may further include adjusting the CAV speed of the optical recording medium to a lowest speed if the CLV speed of the optical recording medium is above a predetermined speed, retrying data detection, data buffering, and data decoding at the lowest CAV speed, and retrying data detection, data buffering, and data decoding while reducing an offset between the target location and a reference location if one of the data detection, data buffering, and data decoding fail.

Further, in the retrying of the data detection, data buffering, and data decoding, the data detection, data buffering, and data decoding are retried while reducing the offset from the target location and the reference location by a predetermined distance.

If one of the data detection, data buffering, and data decoding fail in the adjusting of the CAV speed and the retried data detection, data buffering, and data decoding, the determination of the successful data detection, data buffering, and data decoding performance may include retrying data detection, data buffering, and data decoding, while reducing the CLV speed of the drive for the optical recording medium. Further, in the retrying of the data detection, data buffering, and data decoding while reducing the CLV speed of the drive, data detection, data buffering, and data decoding can be performed until the CLV speed of the optical recording medium reaches the lowest CLV speed. If one of the data detection, data buffering, and data decoding fail, the drive may also transmit information indicating an error to the host computer.

To accomplish the above and/or other aspects and advantages, embodiments of the present invention provide a data processing system, including a host having an input and a CPU, and a drive for reading from and/or writing to a recording medium, including a controller, a driver and an interface interfacing with the host through the input, wherein the controller checks a CLV of the drive for the recording medium, controls an adjustment of a CAV speed of the drive for the recording medium, and controls another attempt to detect data, buffer data, and/or decode data from the recording medium when a previous attempt failed.

To accomplish the above and/or other aspects and advantages, embodiments of the present invention may further provide a medium including computer readable code controlling an operation of a drive, to detect, buffer, and/or decode data at a target location on a recording medium, check a CLV speed of the drive for the recording medium, adjust a CAV speed of the drive for the recoding medium, and retry data detection, data buffering, and/or data decoding if one of the data detection, data buffering, and data decoding fail, and transmit the decoded data to a host computer if the data detection, data buffering, and data decoding are performed successfully.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a flow chart illustrating a method of performing operation 306 of FIG. 3, according to an embodiment of the present invention.

DETAILED DESCRIPTION OF THE PREFERRED EMBODIMENTS

Figure 1:
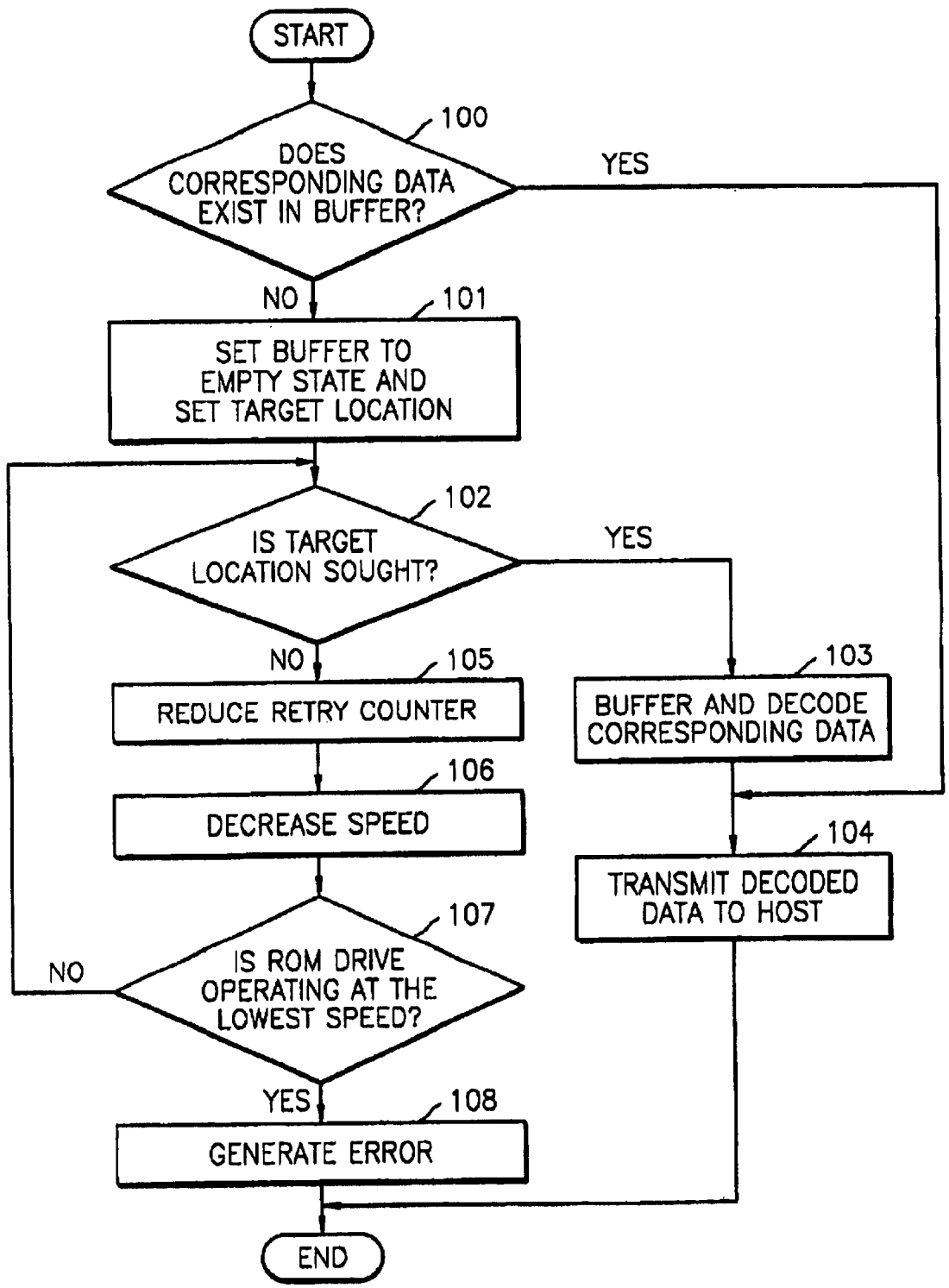
FIG. 1 is a flow chart illustrating a conventional method of processing data in a Read Only Memory (ROM) drive.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
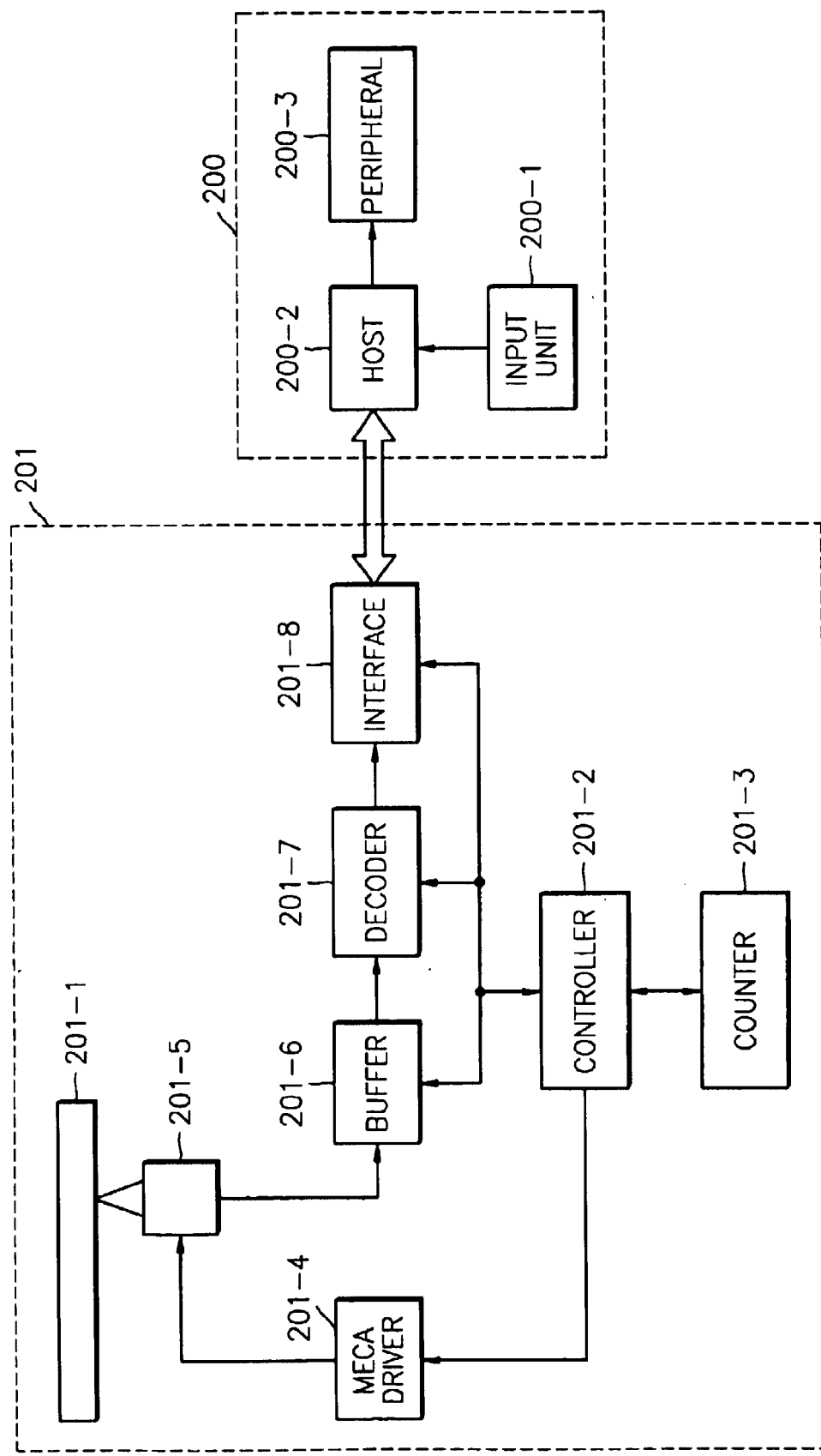
FIG. 2 is a block diagram illustrating a ROM drive and a host computer, according to an embodiment of the present invention.

FIG. 2 is a block diagram illustrating a host computer 200 and a ROM drive 201. As illustrated in FIG. 2, the host computer 200 includes an input unit 200-1, a CPU 200-2, and a peripheral unit 200-3. The ROM drive 201 includes an optical disc 201-1, a controller 201-2, a counter 201-3, a meca driver 201-4, an optical pick-up 201-5, a buffer 201-6, a decoder 201-7, and an interface 201-8. Embodiments of the present invention can be implemented by use of a system of the host computer 200 and/or the ROM drive 201.

Figure 3:
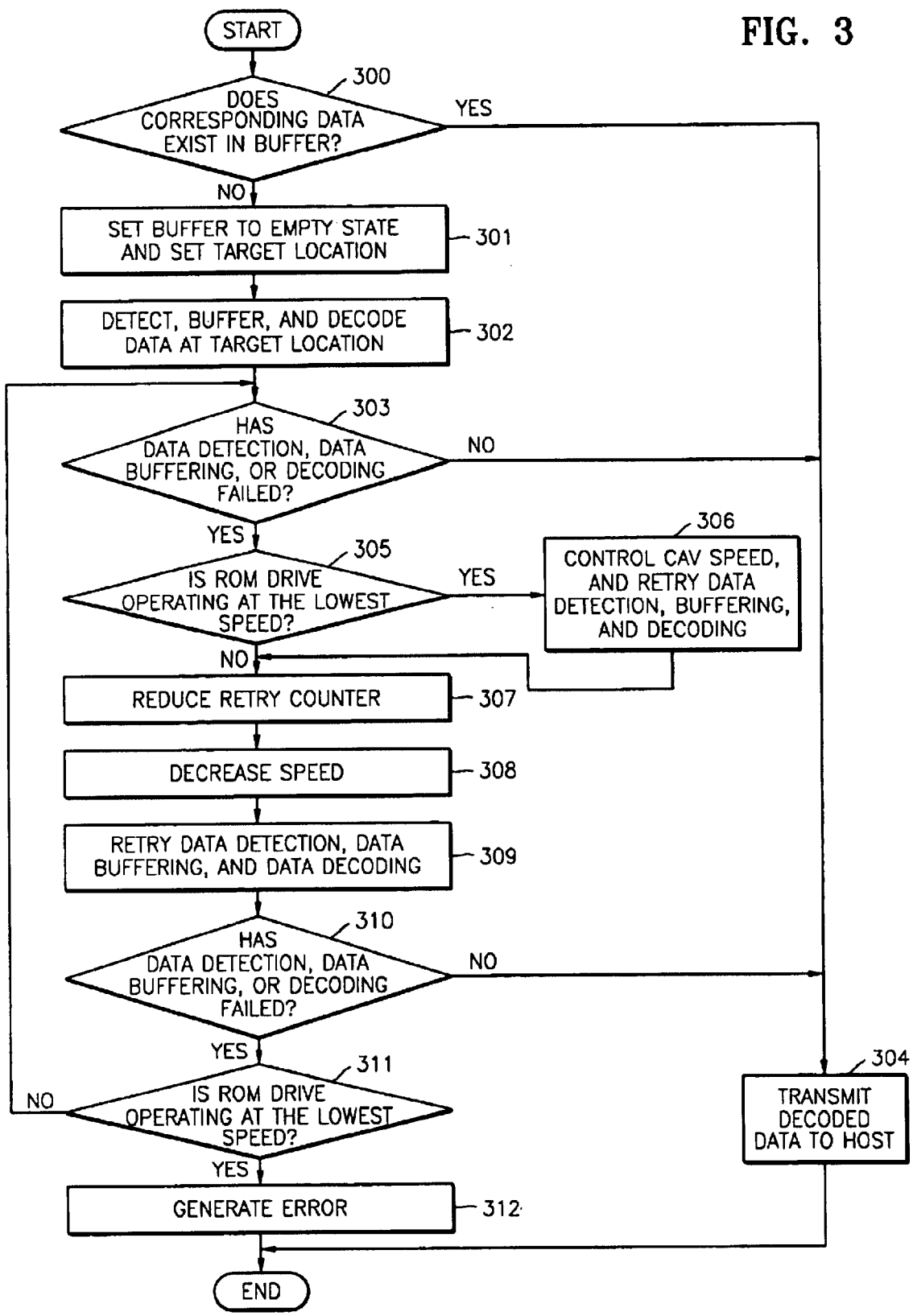
FIG. 3 is a flow chart illustrating a method of processing data in a ROM drive, according to an embodiment of the present invention.

FIG. 3 is a flow chart illustrating a method of processing data in a ROM drive, according to an embodiment of the present invention.

As illustrated in FIG. 3, this data processing method may include: determining whether data required from the host computer exists in a buffer (operation 300); if the corresponding data does not exist in the buffer, setting the buffer to an empty state and setting a target location (operation 301); trying to detect, buffer, and decode the corresponding data at the target location (operation 302); determining whether data detection, data buffering, or data decoding has failed (operation 303); if data detection, data buffering, and data decoding are performed successfully, transmitting the decoded data to a host computer (operation 304); if data detection, data buffering, or data decoding has failed, determining whether the ROM drive is operating at the lowest speed (operation 305); if the ROM drive operates at the lowest speed, controlling a CAV (Constant Angle Velocity) speed and retrying data detection, data buffering, and data decoding (operation 306); if the ROM drive does not operate at the lowest speed, reducing a retry count for a speed (operation 307); decreasing the speed (operation 308); retrying data detection, data buffering, and data decoding (operation 309); determining whether data detection, data buffering, or data decoding has failed (operation 310); if data detection, data buffering, or data decoding has failed, determining whether the ROM drive operates at the lowest speed (operation 311); and if the ROM drive operates at the lowest speed, generating an error (operation 312).

FIG. 4 is a flow chart illustrating a method of performing operation 306 of FIG. 3, according to an embodiment of the present invention.

The method of performing operation 306 may include: setting a CAV speed to the lowest speed (operation 306-1); retrying data detection, data buffering, and data decoding at the lowest CAV speed (operation 306-2); determining whether data detection, data buffering, and data decoding has been performed successfully (operation 306-3); if data detection, data buffering, or data decoding have failed, retrying target location detection, buffering, and decoding while reducing an offset between the target location and a reference location (operation 306-4); and determining whether data detection, data buffering, and data decoding are performed successfully while retrying data detection, data buffering, and data decoding by a predetermined count (operation 306-5).

Next, the present invention will be described in detail with reference to FIGS. 2 and 3.

Embodiments of the present invention can be implemented by a host computer 200 connected through data buses and a ROM drive 201 for reproducing data recoded on an optical disc 201-1.

Referring to FIG. 2, the input unit 200-1 of the host computer 200 selectively sets a data reproduction operation and sends, to the CPU 200-2, a command requiring data reproduction. Then, the CPU 200-2 controls data transmission operations of the ROM drive 201, according to the command from the input unit 200-1. A peripheral unit 200-3 is also connected to the CPU 200-2, to display or store output data.

The controller 201-2 of the ROM drive 201 controls regeneration operations of the optical disc 201-1, according to the command received from the host computer 200. The controller 201-2 detects defects of the optical disc 201-1 and determines a speed of the optical disc 201-1 according to the detection result. The counter 201-3 then counts a read retry count of data on the defective optical disc 201-1. The counter 201-3 counts a read retry count of data, using a reference count set according to the speed of the ROM drive 201 under the control of the controller 201-2. The meca driver 201-4 then moves the optical pick-up 201-5 according to a control signal from the controller, with the buffer 201-6 storing the data read by the optical pick-up. The decoder 201-7 decodes the data stored in the buffer 201-6 and the interface 201-8 transmits the decoded data to the host computer 200 or stops the transmission, according to a control of the controller 201-2.

Next, in another embodiment, a method of processing data in the ROM drive and transmitting the data to the host computer 200 will be described.

The ROM drive 201 receives a read type command having 12-byte packets, for example, from the CPU 200-2 of the host computer 200. The controller 201-2 of the ROM drive 201, which has received the command through the interface 201-8, analyzes the command and determines whether the command is a standard command.

Thereafter, the controller 201-2 determines whether data corresponding to the received command exists in the buffer 201-6 (operation 300). If the corresponding data exists in the buffer 201-6, the data is decoded in the decoder 201-7 and transmitted to the host computer 200 through the interface 201-8 (operation 304).

However, if the corresponding data does not exist in the buffer 201-6, the controller 201-2 sets the buffer 201-6 to an empty state and sets a target location on the optical disc 201-1 at which data corresponding to the command from the host computer 200 is located (operation 301).

The controller 201-2 then controls the meca drive 2014 to move the optical pick-up 201-5 to the target location. The data at the target location is then detected, buffered, and decoded (operation 302). Next, the controller 201-2 determines whether data detection, data buffering, or data decoding has failed (operation 303). However, in a case where defects such as scratches or black dots exist on the optical disc 201-1, the optical pick up 201-5 cannot move to the target location, as the target location cannot be located, for example.

If data detection, data buffering, and data decoding are performed successfully, the controller 201-2 transmits the decoded data to the host computer 200 through the interface 201-8 (operation 304).

If data detection, data buffering, or data decoding fail due to the defects on the optical disc 201-1, the controller 201-2 determines whether the ROM drive 201 was operating at its lowest speed (operation 305). Here, it can be assumed that the lowest speed of the ROM drive 201 is a CLV 4 speed, for example.

If the ROM drive 201 is operating at the lowest speed, e.g., at the CLV 4 speed, the controller 201-2 adjusts a CAV speed of the ROM drive 201 and controls the meca driver 201-4 so that the optical pick-up 201-5 is moved to the target location. Then, data detection at the target location, data buffering, and data decoding are retried (operation 306). Hereafter, operation 306 will be described in detail with reference to FIG. 4.

Again, if the ROM drive 201 operates at the lowest speed, e.g., at the CLV 4 speed, the controller 201-2 adjusts the CAV speed of the ROM drive 201 to the lowest speed (operation 306-1). Here, it can be assumed that the lowest CAV speed of the ROM drive 201 is a 16 speed, for example.

Data detection, data buffering, and data decoding are then retried at the lowest CAV speed adjusted by the controller 201-2 (operation 306-2). Next, it is determined whether data detection, data buffering, and data decoding were performed successfully (operation 306-3). In a case where data detection, data buffering, and data decoding are performed successfully at the lowest CAV speed, the process proceeds to operation 304.

In the case where data detection, data buffering, or data decoding fail at the lowest CAV speed, the ROM driver 201 retries data detection, data buffering, and data decoding while reducing an offset between the target location and a reference location (operation 306-4). The retry count is counted by the counter 203-3. The retry count can be set by the controller 201-2.

If data detection, data buffering, and data decoding are performed successfully before the retry count is terminated, the process proceeds to operation 304. If data detection, data buffering, or data decoding is not performed successfully until the retry count is terminated, the process proceeds to operation 307 (operation 306-5).

Returning to FIGS. 2 and 3, if data detection, data buffering, or data decoding fail, due to certain defects on the optical disc 201-1, after the controller 201-2 controls the meca driver 201-4 so the optical pick-up 201-5 is moved to the target location, or if data detection, data buffering, or data decoding fail at the lowest CAV speed, the controller 201-2 reduces the count of the counter 201-3 set for the speed of the ROM drive (operation 307) and decreases the speed by a predetermined amount (operation 308). The counter 201-3 counts a read retry count of data on the optical disc 201-2. The retry count value is set by the controller 201-2. The retry count can be predetermined according to the speed of the ROM drive.

Successively, data detection, data buffering, and data decoding are retried (operation 309). The controller 201-2 then determines whether data detection, data buffering, or data decoding fail (operation 310). If data detection, data buffering, and data decoding are performed successfully, the process proceeds to operation 304. If data detection, data buffering, or data decoding has failed, the controller 201-2 determines whether the ROM drive is operating at the lowest speed (operation 311).

If the ROM drive 201 is operating at the lowest speed, the controller 201-1 generates an error and transmits the error to the host computer 200 (operation 312).

As described above, according to embodiments the present invention, it is possible to improve the quality of a ROM drive by preventing the deterioration of data readability and error generation caused by speed deterioration of the ROM, drive from defects on an optical recording medium.

Lastly, it is noted that embodiments of the present invention may be implemented by way of computer readable code in a medium, controlling the implementations of the aforementioned embodiments. Medium can include such media as a storage unit, e.g., in the driver, a hard disk drive, an optical recording medium, a wave guide, or a signal, etc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of processing data, comprising:

detecting, buffering, and decoding data at a target location on an optical recording medium;

checking a CLV speed of a drive for the optical recording medium, adjusting a CAV speed of the drive for the optical recoding medium, and retrying data detection, data buffering, and data decoding if one of the data detection, data buffering, and data decoding fail; and transmitting the decoded data to a host computer if the data detection, data buffering, and data decoding are performed successfully.

2. The method of claim 1, wherein the adjusting of the CAV speed and retrying of the data detection, data buffering, and data decoding further comprises:

adjusting the CAV speed of the optical recording medium to a lowest speed if the CLV speed of the optical recording medium is above a predetermined speed;

retrying data detection, data buffering, and data decoding at the lowest CAV speed; and retrying data detection, data buffering, and data decoding while reducing an offset between the target location and a reference location if one of the data detection, data buffering, and data decoding fail.

3. The method of claim 2, wherein in the retrying of the data detection, data buffering, and data decoding, the data detection, data buffering, and data decoding are retried while reducing the offset from the target location and the reference location by a predetermined distance.

4. The method of claim 1, wherein if one of the data detection, data buffering, and data decoding fail in the adjusting of the CAV speed and the retried data detection, data buffering, and data decoding, the determination of the successful data detection, data buffering, and data decoding performance comprises:

retrying data detection, data buffering, and data decoding, while reducing the CLV speed of the drive for the optical recording medium.

5. The method of claim 4, wherein in the retrying of the data detection, data buffering, and data decoding while reducing the CLV speed of the drive, data detection, data buffering, and data decoding are performed until the CLV speed of the optical recording medium reaches the lowest CLV speed.

6. The method of claim 4, wherein if one of the data detection, data buffering, and data decoding fail, the drive transmits information indicating an error to the host computer.

7. A data processing system, comprising:

a host having an input and a CPU; and a drive for reading from and/or writing to a recording medium, including a controller, a driver and an interface interfacing with the host through the input, wherein the controller checks a CLV of the drive for the recording medium, controls an adjustment of a CAV speed of the drive for the recording medium, and controls another attempt to detect data, buffer data, and/or decode data from the recording medium when a previous attempt failed.

8. The data processing system of claim 7, wherein the controller controls the transmission of decoded data to the host computer if the subsequent attempt of data detection, data buffering and/or data decoding are performed successfully.

9. The data processing system of claim 7, wherein the adjusting of the CAV speed and subsequent attempt of the data detection, data buffering, and/or data decoding further comprises:

adjusting the CAV speed of the recording medium to a lowest speed if the CLV speed of the recording medium is above a predetermined speed;

subsequently attempting data detection, data buffering, and/or data decoding at the lowest CAV speed; and subsequently attempting data detection, data buffering, and/or data decoding while reducing an offset between a target location and a reference location if one of the data detection, data buffering, and data decoding fail.

10. The data processing system of claim 9, wherein in the subsequent attempt of the data detection, data buffering, and/or data decoding, the data detection, data buffering, and/or data decoding are subsequently attempted while reducing the offset from the target location and the reference location by a predetermined distance.

11. The data processing system of claim 7, wherein if one of the data detection, data buffering, and data decoding fail in the adjusting of the CAV speed and the subsequently attempted data detection, data buffering, and/or data decoding, a determination of a successful data detection, data buffering, and/or data decoding performance comprises:

subsequently attempting data detection, data buffering, and data/or decoding, while reducing the CLV speed of the drive for the recording medium.

12. The data processing system of claim 11, wherein in the subsequent attempt of the data detection, data buffering, and/or data decoding while reducing the CLV speed of the drive, data detection, data buffering, and/or data decoding are performed until the CLV speed of the recording medium reaches the lowest CLV speed.

13. The data processing system of claim 4, wherein if one of the data detection, data buffering, and data decoding fail, the drive transmits information indicating an error to the host.

14. A medium, comprising computer readable code controlling an operation of a drive, to:

detect, buffer, and/or decode data at a target location on a recording medium;

check a CLV speed of the drive for the recording medium, adjust a CAV speed of the drive for the recoding medium, and retry data detection, data buffering, and/or data decoding if one of the data detection, data buffering, and data decoding fail; and transmit the decoded data to a host computer if the data detection, data buffering, and data decoding are performed successfully.

15. The medium of claim 14, wherein the adjusting of the CAV speed and retrying of the data detection, data buffering, and data/or decoding further comprises the computer readable code controlling an:

adjusting of the CAV speed of the recording medium to a lowest speed if the CLV speed of the recording medium is above a predetermined speed;

retrying of the data detection, data buffering, and/or data decoding at the lowest CAV speed; and retrying of the data detection, data buffering, and/or data decoding while reducing an offset between the target location and a reference location if one of the data detection, data buffering, and data decoding fail.

16. The medium of claim 15, wherein in the retrying of the data detection, data buffering, and/or data decoding the data detection, data buffering, and data decoding are retried while reducing the offset from the target location and the reference location by a predetermined distance.

17. The medium of claim 14, wherein if one of the data detection, data buffering, and data decoding fail in the adjusting of the CAV speed and the retried data detection, data buffering, and/or data decoding, the determination of the successful data detection, data buffering, and/or data decoding performance comprises:

controlling a retrying of the data detection, data buffering, and/or data decoding, while reducing the CLV speed of the drive for the optical recording medium.

18. The medium of claim 17, wherein in the retrying of the data detection, data buffering, and/or data decoding while reducing the CLV speed of the drive, data detection, data buffering, and/or data decoding are controlled to perform until the CLV speed of the optical recording medium reaches the lowest CLV speed.

19. The method of claim 17, wherein if one of the data detection, data buffering, and data decoding fail, the drive is controlled to transmit information indicating an error to the host computer.

* * * * *

UNITED STATES PATENT AND TRADEMARK OFFICE
CERTIFICATE OF CORRECTION

PATENT NO.    : 6,834,032 B2
DATED         : December 21, 2004
INVENTOR(S)   : In-Koo Kim It is certified that error appears in the above-identified patent and that said Letters Patent is hereby corrected as shown below:

Column 6,
Line 60, please change "recoding" to -- recording --.

Column 8,
Lines 15 and 41, please change "and data/or decoding" to -- and/or data decoding --.
Line 32, please change "recoding" to -- recording --.

Signed and Sealed this

Fourteenth Day of June, 2005

JON W. DUDAS
*Director of the United States Patent and Trademark Office*